United States Patent [19]

Malcolm et al.

[11] 4,332,027

[45] May 25, 1982

[54] LOCAL AREA CONTENTION NETWORK DATA COMMUNICATION SYSTEM

[75] Inventors: Michael A. Malcolm, Del Mar, Calif.; Mark L. C. Gerhold, West Chester, Pa.; Gary W. Hodgman, West Bloomfield, Mich.; Marshall M. Parker, San Diego, Calif.; Lawrence D. Rogers, Del Mar, Calif.; John E. Spracklen, San Diego, Calif.

[73] Assignee: Burroughs Corporation, Detroit, Mich.

[21] Appl. No.: 145,606

[22] Filed: May 1, 1980

[51] Int. Cl.³ .................................................. H04J 6/00
[52] U.S. Cl. ......................................... 370/94; 455/58
[58] Field of Search ................... 370/6, 92, 93, 94, 85; 455/58, 31, 50, 51

[56] References Cited

U.S. PATENT DOCUMENTS

| | | | |
|---|---|---|---|
| 3,482,046 | 12/1969 | Hughson et al. | 370/93 |
| 4,199,663 | 4/1980 | Herzog | 370/85 |
| 4,236,245 | 11/1980 | Freeny et al. | 370/94 |
| 4,237,553 | 12/1980 | Larson et al. | 370/94 |
| 4,245,341 | 1/1981 | Hoffman et al. | 370/92 |

*Primary Examiner*—Benedict V. Safourek
*Attorney, Agent, or Firm*—Mervyn L. Young; Kevin R. Peterson

[57] ABSTRACT

This disclosure relates to a station for a data transmission network which is adapted to operate in a cyclic mode for contending for access to the network channel along with other stations of the network. The three states of the cycle are the idle state, the packet-being-transmitted state and the acknowlegement period state. Each station will not begin transmission until it determines that the channel is in an idle state. Once the station has determined that the channel is idle, it will then delay for a period of time that is randomly chosen and, if the channel is still idle, will then begin transmission. In this way, contention conflicts between stations is minimized without unduly restricting communication between stations. Following transmission, the channel will again be quiescent a short period of time before the acknowledgement signal is transmitted from the receiver. Each packet of data to be transmitted is of a fixed length so as to provide for synchronization between various stations contending for access to the channel.

12 Claims, 9 Drawing Figures

LOCAL AREA CONTENTION NETWORK DATA COMMUNICATION SYSTEM

BACKGROUND OF THE INVENTION

1. Field of Invention

This invention relates to a network of data stations and more particularly to such a network wherein control of the transmission between stations is shared by the respective stations.

2. Description of the Prior Art

Prior art terminal networks usually have been controlled by a master computer which receives transmission requests from the respective terminals and grants access to a transmission channel by the individual terminals when the channel is available and according to some priority arrangement. Such master computers add to the cost of the terminal network and are not required for some networks where the terminals need communicate only between themselves or with a common storage file. Thus, it is desirable to have a terminal network where the transmission control is embedded in or shared by the stations making up that network.

Prior art networks not having a master controller, have employed "contention" schemes whereby each node of the network contends for the transmission medium whenever it is ready to transmit. One of the earliest contention networks was the "Aloha" system built by the University of Hawaii. In this system, each node transmitted whenever it had a packet ready for transmission. Whenever a portion of one node's transmission overlapped with another node's transmission, that overlap destroyed both packets. If the sending node did not receive an acknowledgment within another packet from the destination node after an arbitrary time period, it would assume that a collision had occurred and retransmit. In order to avoid continuously repeated collisions, some method of introducing a random retransmission delay had to be introduced.

An attempt at reducing the effects of collision in contention-type networks is disclosed in the Metcalfe et al. U.S. Pat. No. 4,063,220 which is directed toward a communication network in which each node is capable of detecting when collision occurs on the channel during that node's transmission, and interrupts its transmission when such a collision occurs. A random number generator is employed to select an interval of time to delay before the next attempt at transmission. However, the collision detection mechanism adds to the complexity of the respective nodes with an increase in the cost of the system. For certain types of transmission media, collision detection is very difficult, if not impossible to implement.

It is, then, an object of the present invention to provide an improved data communication network which does not require a master controller to synchronize data transmissions on a common bus or channel.

It is another object of the present invention to provide an asynchronous data communication network wherein each node contends for access to a channel medium in a manner such as to minimize conflicts between the respective nodes without requiring transmitting stations to be capable of detecting collisions.

It is still another object of the present invention to provide a contention network data communication system wherein the respective nodes contend for access to the channel in a cyclic fashion with synchronization between the states of each node.

It is still a further object of the present invention to provide a contention network data communication system wherein an acknowledgment signal is received (or not received) by the transmitting station, within a predetermined period of time after transmission.

SUMMARY OF THE INVENTION

In order to achieve the above identified objects, the present invention is directed toward a station for a data transmission network which is adapted to operate in a cyclic mode for contending for access to the network channel along with other stations of the network. The three states of the cycle are the idle state, the packet-being-transmitted state and the acknowlegment period state. Each station will not begin transmission until it determines that the channel is in an idle state. Once the station has determined that the channel is idle, it will then delay for a period of time that is randomly chosen and, if the channel is still idle, will then begin transmission. Following transmission, the channel will again be quiescent for a short period of time before the acknowledgment signal is transmitted from the receiver. Each packet of data to be transmitted is of a fixed length so as to provide for synchronization between the various stations contending for access to the channel.

A feature then of the present invention resides in a station for a data transmission network which station is adapted to contend for access to the network channel. Once the station has determined that the channel is idle, it will then delay for a period of time that is randomly chosen and, if the channel is still idle, will then begin transmission.

Another feature of the present invention is the provision of an acknowledgment signal within a predetermined duration of time after each transmission.

DESCRIPTION OF THE DRAWINGS

The above, and other objects, advantages and features of the present invention will become more readily apparent from a review of the following specification wherein.

GENERAL DESCRIPTION OF THE INVENTION

Figure 1A:
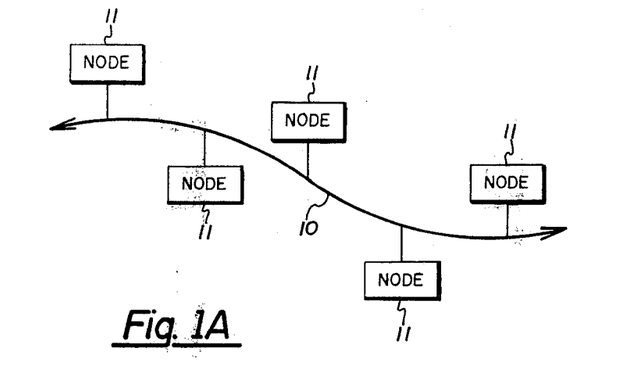
FIGS. 1A and 1B are representations of different networks employing the present invention.
Figure 1B:
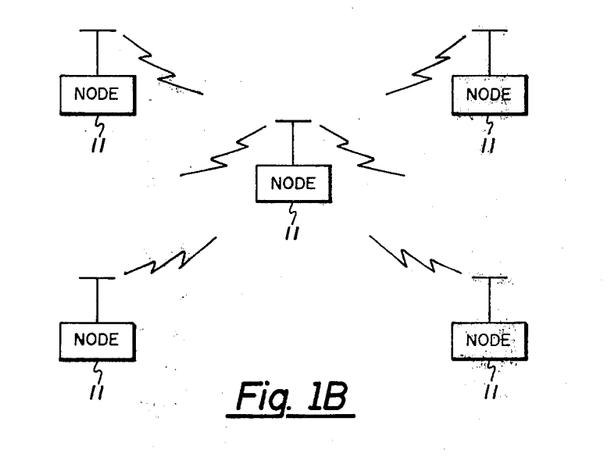

The present invention is directed toward an interface which is used to connect stations into a local area communication network. The network uses a shared communication channel and distributed control. There is no central arbitrator of channel utilization. The shared communication medium can be a twisted pair, a coaxial cable, fiber optics, and so forth, as illustrated in FIG. 1A, or the network may employ radio communication such as illustrated in FIG. 1B. In the case of radio communication each node has its own transmitter, receiver and antenna.

Figure 2:
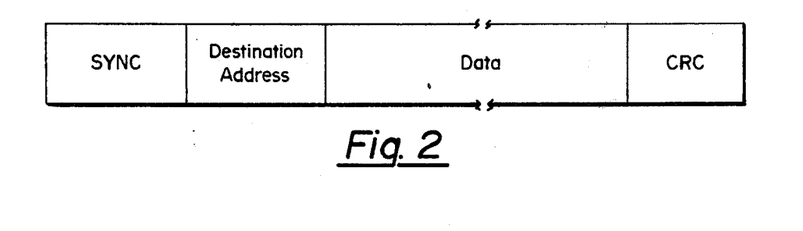
FIG. 2 is a diagram of an information packet employed in the present invention.

The data structure employed is illustrated in FIG. 2 and is a fixed-sized packet which contains a fixed number of data bits along with the information necessary for interface synchronization, message routing and error detection. As illustrated in FIG. 2, the first field of the packet is the SYNC code which is a four bit field that indicates that information follows and serves to synchronize the receiving node for reception of the information packet which follows. The second field is the Destination Address code which is 16 bits long and designates the stations for which the message is destined. The Data Field consists of 132 8-bit bytes. The last field is the cyclic redundancy check (CRC) code which contains a 16-bit error detection code. A new CRC code is generated by the node during packet reception and checked against the transmitted CRC code. Other means of error detection are also employed.

As was indicated above, the present invention is directed toward a contention network. That is to say, each station of the network transmits packets independently of the other nodes, possibly interfering or colliding with other transmissions. If the transmitted packet is received correctly by the destination station, then the receiver responds with an acknowledgment signal. If the acknowledgment signal is not received by the transmitting station during the acknowledgment period immediately following the packet transmission, then the transmitter assumes that the transmission was unsuccessful.

Figure 3A:
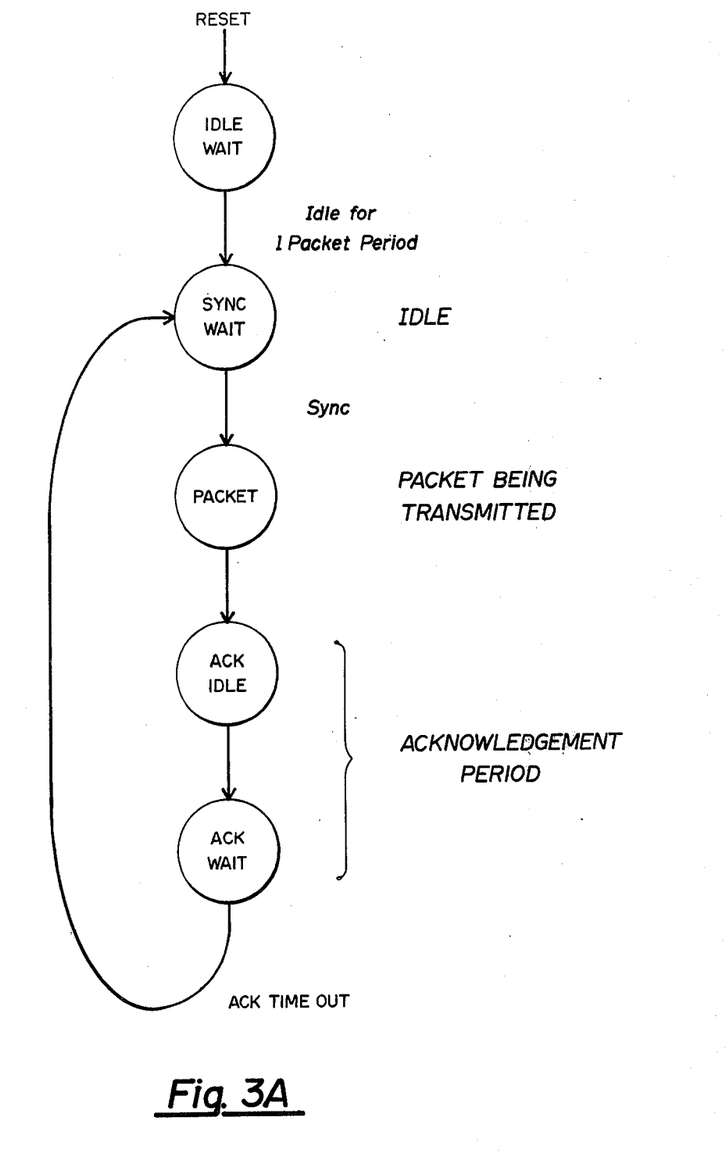
FIGS. 3A and 3B are flow charts illustrating, respectively, the channel state machine and the transmission method of the present invention.

The channel state machine for each node in the present invention is illustrated in FIG. 3A. As indicated therein, the network channel cycles sequentially through three states: idle, packet-being-transmitted, and acknowledgment period. Each station continually monitors the channel and keeps track of its state. Because there is a propagation delay for the signal, the exact times of transitions between the states vary from point to point along the network, but they are all synchronized within a fixed time interval.

The specific cycle of the channel state machine will now be described with relation to FIG. 3A. Upon reset or power up, the channel state machine enters the SYNC WAIT state after the channel has been quiescent for at least one packet transmission period. Upon detection of any data on the channel (e.g., the SYNC code of the packet), the channel state machine enters the PACKET state which lasts a fixed amount of time. After the PACKET state, the channel state machine enters the ACK IDLE state followed by the ACK WAIT state, each of fixed duration. After the ACK WAIT state, the channel state machine returns to the SYNC WAIT state.

As described in FIG. 3A, the states of the channel state machine correspond to the network channel states as follows: The channel state machine is in the SYNC WAIT state whenever the channel is in the idle state, the PACKET state whenever the channel is in packet-being-transmitted state, and ACK IDLE or ACK WAIT state whenever the channel is in the acknowledgment period state. The channel should be quiescent during the ACK IDLE state of the channel state machine; if it is not (i.e., if any channel activity is detected during the ACK IDLE state), it is considered an error in the present transmission, even if an ACK signal appears on the channel during the subsequent ACK WAIT state.

Figure 3B:
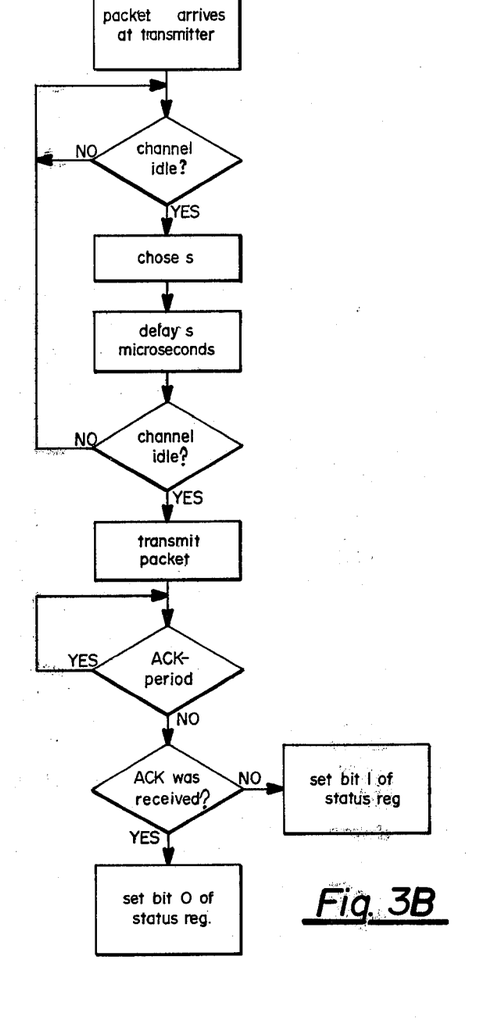

When a packet to be transmitted is loaded into the interface of a particular node, that interface operates in a manner that will now be described in relation to FIG. 3B.

Step 1. Upon arrival of a packet to be transmitted, the interface checks to see if the channel is idle. If the channel is either in the packet-being-transmitted state or the acknowledgment state, then the transmitter waits until the channel becomes idle.

Step 2. An integer s is chosen randomly in the interval [O,S] with each of the S+1 possible choices being equally probable. The transmitter then delays for s microseconds. If the channel is still idle at the end of the delay, then the packet is transmitted. If at that time the channel is not idle, then the transmitter goes back to Step 1.

Step 3. The transmitter waits for the acknowledgment period to complete. It then sets the interface status register according to whether or not an acknowledgment signal was received during the acknowledgment period. The setting of the status register causes an interrupt request of the resident computer.

The choice of S is somewhat arbitrary depending upon the transmission speed and packet length. In the present invention, a value of about $10^8$ divided by the channel baud rate should perform well over a wide range of packet loads. An important parameter is the propagation delay time t from one end of the network to the other, which is used in determining the duration of the acknowledgment period. For a five thousand foot cable medium, the propagation delay time t is approximately 8 microseconds. When the transmitter and receiver are at opposite ends of the network, the last bit transmitted requires t microseconds to arrive at the receiver. The receiver then delays for a period of 2t before transmitting the acknowledgment signal. The acknowledgment signal takes another t microseconds to arrive at the transmitter node. After transmitting the acknowledgment signal, the receiver sets the interface status register to indicate that a packet has been received. The setting of the status register causes an interrupt request of the resident computer.

With a network of stations as described above, the PACKET state of the channel state machine for each station will always be of fixed duration, namely the packet transmission time. The receiver will wait for a time 2t before replying with the acknowledgment signal and then another time 2t for the idle state to begin. If the receiver detects any activity on the channel during the first waiting period, at the end of the packet-being-transmitted state, it will not send the acknowledgment signal. If the transmitter detects any channel activity during the first waiting period following the transmission of a packet, it will ignore any acknowledgment signal on the channel during the following ACK WAIT state.

With the conditions described above, it can be demonstrated that the channel state machine of each terminal in the network will be synchronized within a time t of all other station channel state machines, and that a transmitting station will receive a valid ACK signal only if the intended receiver has correctly received the packet.

DETAILED DESCRIPTION OF THE INVENTION

A resident computer in each station is coupled to the channel by the interface of the present invention. Received packets and packets to be transmitted are transferred between the interface and resident computer across a single-byte input/output port P, as described below. An interrupt request signal and two reset signals complete the interface to the resident computer. Operations that can be performed on the interface are Reset, Read Status, Load Packet, and Unload Packet.

Figure 4A:
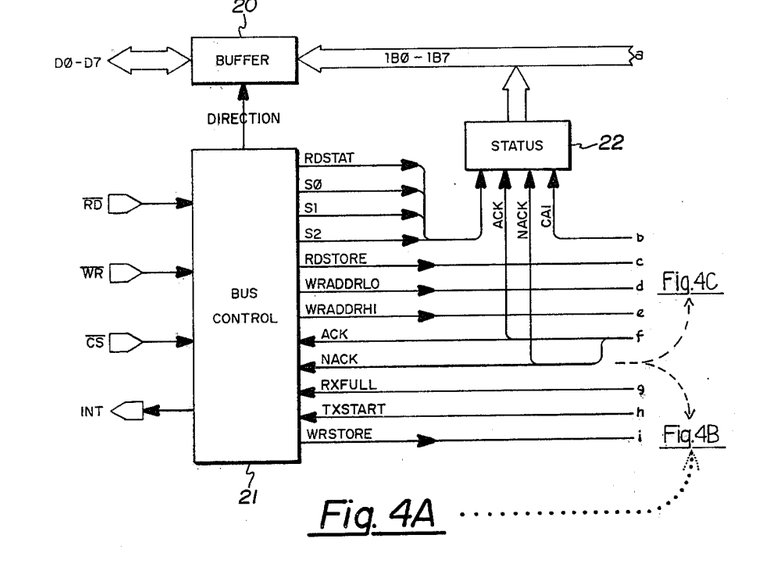
FIGS. 4A, 4B and 4C are schematic diagrams illustrating the terminal interface of the present invention.
Figure 4B:
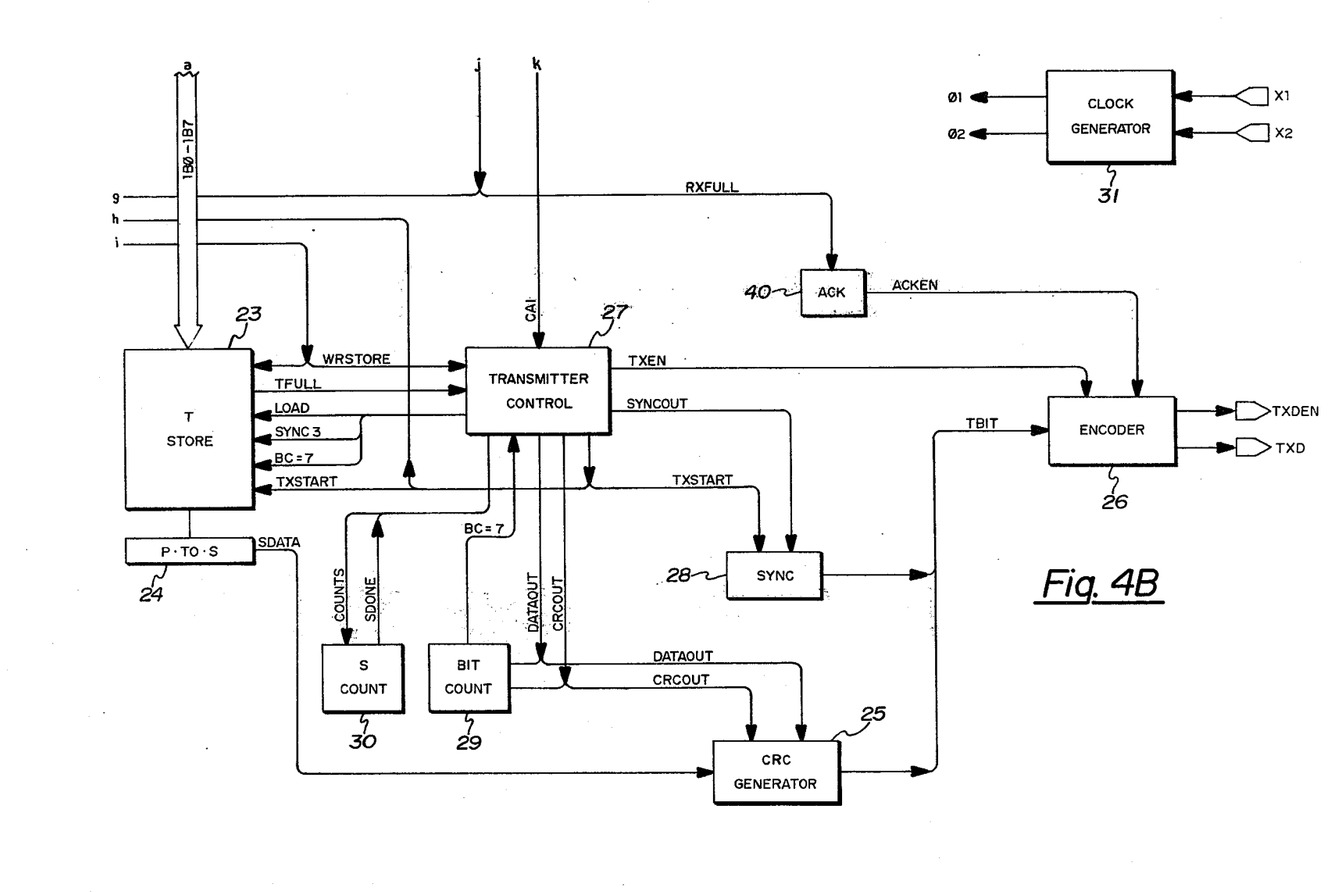
Figure 4C:
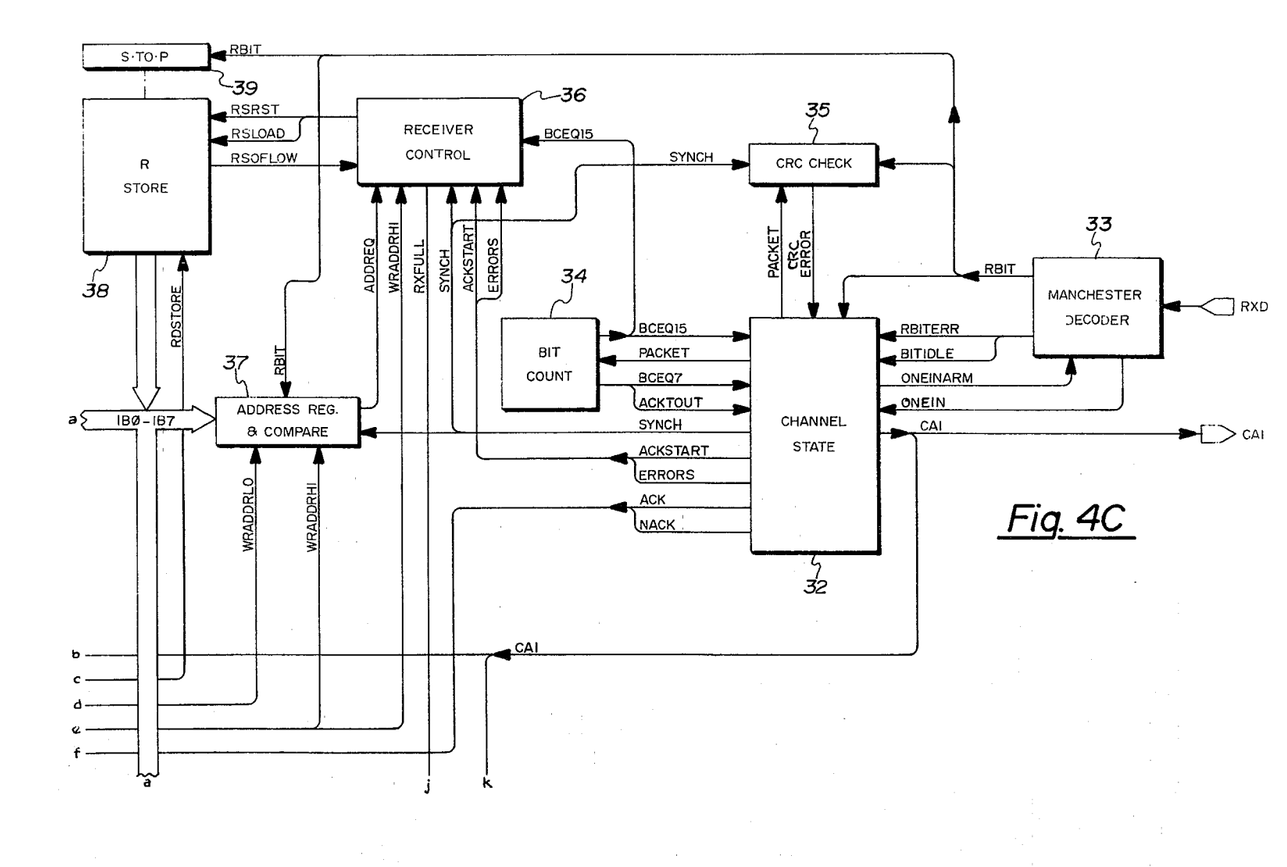

The interface between the resident computer and the channel is illustrated in FIGS. 4A, 4B and 4C. The interface communicates with the resident computer through a set of signals consisting of read $\overline{RD}$, write $\overline{WR}$, circuit select $\overline{CS}$, interrupt request $\overline{INT}$, and an 8-bit data bus. The transmitter loads packets from the resident computer and transmits them over the channel according to the transmission algorithm described above. The receiver receives packets from the channel and unloads them to the resident computer. The tasks of CRC generation and checking, line monitoring and data encoding are done by the interface and not by the resident computer. Since the receiver and transmitter are independent, they can both be active at the same time, as when the transmitter is sending a packet while the receiver is unloading a different packet to the resident computer.

In FIG. 4A, data is transferred between the resident computer and interface by way of port P which comprises buffer 20 and bus control 21. Data bus buffer 20 is a bidirectional buffer for the 8 data signals which comprise the input/output port P. The data transfer depends upon the states of the read $\overline{RD}$, write $\overline{WR}$, and circuit select $\overline{CS}$ signals to the bus control 21.

Status register 22 contains bits to indicate the state of the interface and the channel in the following manner:

| Bit | Status |
| --- | --- |
| 0 | Transmission complete, ACK received (reset when status byte is read) |
| 1 | Transmission complete, no ACK received (reset when status byte is read) |
| 2 | Correct packet received (reset when status byte is read) |
| 3 | Not used |
| 4 | Not used |
| 5 | Channel activity indicator (1 when channel is busy; 0 when channel is idle) |
| 6 | An ACK signal was detected on the channel, indicating a good packet transmission (reset when status byte is read) |
| 7 | Bad data on channel. A bad packet, a collision, or noise was detected on the channel. (reset when status byte is read) |

Bus control 21 responds to the $\overline{RD}$ and $\overline{CS}$ signals with a read operation and the $\overline{WR}$ and $\overline{CS}$ signals with a write operation. Bus control 21 maintains a simple state machine to determine the source (or destination) of the read or write operations. Possible sources of read data are status register 22 and receiver store 38. Destinations for written data are address register 37 and transmitter store 23.

In FIG. 4B, transmitter store 23 holds a packet of data to be transmitted. It is a FIFO store of 134 bytes (132 for data and 2 for the destination address). Data to be transmitted leaves the transmitter store 23 by way of parallel to serial buffer 24. Data transmission is controlled by transmitter control 27 which initiates a packet transmission employing the transmission algorithm described above and in accordance with the value from S count unit 30. S count unit 30 is comprised of a counter driven by a random clock (neither of which is shown).

Transmitter control 27 also synchronizes the other parts of the transmitter to ensure packet transmission.

CRC generator 25 builds the CRC code of the packet being transmitted as data in transmitter store 23 is being transmitted. When transmitter store 23 becomes empty, the resultant CRC is transmitted. As was indicated above, the first field of the packet is a four bit SYNC code which is generated by SYNC generator 28.

The packet being transmitted passes through encoder 26 which encodes each bit in a Manchester code before transmission. The four sources of data to be transmitted (as indicated above) are the SYNC code 28, the transmitter store 23 (for destination address and data), the CRC generator 25, and the acknowledgment code 40. The output select decides which of these, if any, is to be sent.

As was indicated above, the three possible channel states (idle, packet-being-transmitted, and acknowledgment period) are maintained in channel state 32 of FIG. 4C for use by both the transmitter and receiver. A timer is required for each change of state. A timer is also used by the transmitter in the delay portion of the transmission algorithm as described above. Input decoder 33 is a Manchester decoder which receives data from the channel. It thus converts the Manchester encoded data into unencoded data. The SYNC code can also be recognized at this point and separated from the data. CRC check 35 is the opposite of CRC generator 25 and serves to verify the correctness of the incoming data.

Receiver store 38 buffers a packet received from the channel to be read by the resident computer. The data enters the receiver store 38 by way of serial to parallel buffer 39. Receiver control 36 synchronizes the parts of the receiver in an order to insure correct packet reception.

On Reset, the interface is loaded from the resident computer with its address. Thereafter, when a packet is detected on the channel, and receiver store 38 is empty, address compare logic 37 checks to see if the packet is intended for the resident computer by comparing the incoming address against the stored address.

Figure 5:
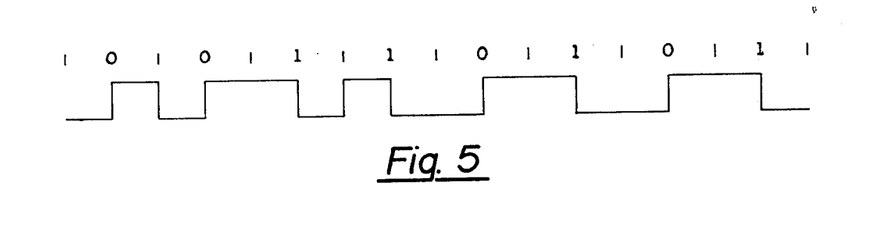
FIG. 5 is a representation of signals in Manchester Code as employed in the present invention.

Manchester encoding is employed to send data with an embedded clock and no DC bias. It is characterized by always having a transition during the middle of a bit interval as illustrated in FIG. 5. A logic zero is a positive going transition while a logic one is a negative going transition.

INTERFACE OPERATION

As was indicated above, the operations that can be performed on the terminal interface are Reset, Read Status, Load Packet and Unload Packet. These operations will now be described.

Reset. The Reset operation is the operation of initializing the interface. The interface is set to the initial state by asserting either of the two reset signals, one of which is used for the power-up reset and the other of which is used for programatic reset. Resetting the interface clears the status register and sets it to zero. When the interface is reset, the resident computer must output the node's unique address as two bytes to port P. This address is used by the receiver to compare with destination address fields of packets being transmitted by other nodes. The interface cannot receive or transmit packets until it loads this address from the resident computer.

Read Status. The interface maintains status register 22 of FIG. 4A which can be read from port P anytime except during the unload packet operation. The resident computer should respond to an interrupt by reading the status register from port P. Depending on which of the bits are set, the resident computer may decide to initiate a load packet or unload packet operation. Reading the status register causes the first three bits of the status register to be reset and consequently resets the interrupt request signal to the resident computer. If the interrupt was requested because of the completed transmission, the interrupt signal may be reasserted immediately as the result of a received packet. If the interrupt was requested due to a received packet, the interrupt signal will not be reasserted until after the entire packet is unloaded from the interface.

Load Packet. The load packet operation causes the interface to be loaded with a packet to be transmitted on the channel. A packet cannot be loaded when another packet is in the process of being transmitted. The resident computer loads the packet by simply sending two destination address bytes to port P followed by 132 data bytes. As soon as the interface has loaded the 134 bytes from the resident computer, it begins transmitting the packet on the channel according to the algorithm described above. After transmission of the packet, when the channel returns to the idle state, the interface requests an interrupt by setting the appropriate bit of the status register.

Unload Packet. The resident computer performs an unload operation with 134 successive read operations of port P, transferring the two-byte destination address (the resident computer's address) followed by 132 bytes of data from the interface to the resident computer. It should be noted that if two packets are sent to the same destination, and the second packet arrives before the first packet has been completely unloaded from the interface, the second packet is not acknowledged and must be retransmitted. Similarly, if a packet is received incorrectly, it must also be retransmitted. In either case, the destination's resident computer will not be informed of the lost or bad packet and the sender will not receive an acknowledgment signal.

EPILOGUE

A data communication network has been disclosed which does not require a master controller to control the transmission between nodes in the network. Each node initiates transmission a random time after the channel is determined to be idle. Should two or more nodes initiate transmission at the same time, transmission will continue, however each node will again seek to initiate transmission after a random period of time. The delay between attempts to initiate transmission varies from node to node according to the random times generated from node to node. In this way, contention conflicts between nodes is minimized without unduly restricting communication between nodes.

While but one embodiment of the present invention has been disclosed, it will be apparent to one skilled in the art that variations and modifications may be made therein without departing from the spirit and scope of the invention as claimed.

What is claimed is:

1. A station in a data communication network having a plurality of such stations coupled to a communication channel, said station comprising:
    storage means to receive an information packet for transmission on said channel;
    sensing means coupled to said channel to detect when said channel is inactive;
    clock means coupled to said sensing means to determine a random period of time after said sensing means detects no activity on said channel; and
    transmitting means coupled to said channel, said clock means and said storage means to transmit said packet on said channel after said random period of time and when there is no activity on said channel.

2. The station according to claim 1 further including:
    receiving means coupled to said channel and to said storage means to receive an acknowledgment signal on said channel within a fixed time interval after said packet has been transmitted so as to indicate that said packet need not be retransmitted.

3. A station according to claim 1 wherein:
    said clock means includes counter means driven by a random clock.

4. A station according to claim 1 wherein:
    said transmitting means transmits said packet during a fixed period of time duration.

5. A station according to claim 1 further including:
    channel state means coupled to said storage means, sensing means and transmitting means to maintain said station in a sequence of states which include, in order, the channel idle state, packet-being-transmitted state, and acknowledgment period state.

6. A station according to claim 5 wherein said acknowledgment period state includes a quiescent period preceding any acknowledgment.

7. A station in a data communication network having a plurality of such stations coupled to a communication channel, said station comprising:
    sensing means coupled to said channel to detect when said channel is inactive;
    clock means coupled to said sensing means to determine a random period of time after sensing means detects no activity on said channel; and
    transmitting means coupled to said channel and said clock means to transmit an information packet on said channel after said random period of time and when there is no activity on said channel.

8. The station according to claim 7 further including:
    receiving means coupled to said channel to receive an acknowledgment signal on said channel a fixed period of time after said packet has been transmitted so as to indicate that said packet need not be retransmitted.

9. A station according to claim 7 wherein:
    said clock means includes counter means driven by a random clock.

10. In a station in a data communication network having a plurality of such stations coupled to a communication channel, said station including detection means coupled to said channel, clock means for determining a random period of time and transmitting means coupled to said clock means and detection means, the method comprising:
    detecting when said channel is inactive;
    determining a random period of time after the detection of no activity on said channel; and
    transmitting an information packet on said channel after said random period of time and when there is no activity on said channel.

11. The method according to claim 10 further including:
    receiving an acknowledgment signal on said channel a fixed period of time after said packet has been transmitted so as to indicate that said packet need not be retransmitted.

12. The method according to claim 10 further including:
    transmitting said information packet during a fixed period of time duration.

* * * * *